US010833844B2

(12) United States Patent
Cunico et al.

(10) Patent No.: US 10,833,844 B2
(45) Date of Patent: Nov. 10, 2020

(54) BLOCKCHAIN LIFECYCLE MANAGEMENT

(71) Applicant: International Business Machines Corporation, Armonk, NY (US)

(72) Inventors: Hernan A. Cunico, Holly Springs, NC (US); Sean Dunne, Blackrock (IE); Liam S. Harpur, Skerries (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 15/848,036

(22) Filed: Dec. 20, 2017

(65) Prior Publication Data
US 2019/0190697 A1    Jun. 20, 2019

(51) Int. Cl.
H04L 29/06 (2006.01)
H04L 9/06 (2006.01)
H04L 9/00 (2006.01)
G06F 16/901 (2019.01)

(52) U.S. Cl.
CPC ........ H04L 9/0637 (2013.01); G06F 16/9014 (2019.01); H04L 9/00 (2013.01)

(58) Field of Classification Search
None
See application file for complete search history.

(56) References Cited

U.S. PATENT DOCUMENTS

| 2016/0342977 | A1 | 11/2016 | Lam | |
| 2017/0116693 | A1 | 4/2017 | Rae et al. | |
| 2017/0337534 | A1* | 11/2017 | Goeringer | G06Q 20/401 |
| 2017/0344580 | A1* | 11/2017 | King | H04L 9/3239 |
| 2018/0006831 | A1* | 1/2018 | Toll | G06F 21/6272 |
| 2018/0062831 | A1* | 3/2018 | Zhang | H04L 9/0643 |
| 2018/0091524 | A1* | 3/2018 | Setty | H04L 9/0643 |
| 2018/0121620 | A1* | 5/2018 | Bastide | H04W 12/12 |
| 2018/0152289 | A1* | 5/2018 | Hunt | H04L 9/0637 |
| 2018/0323963 | A1* | 11/2018 | Stollman | H04L 9/3239 |
| 2018/0359089 | A1* | 12/2018 | Innes | G06F 16/182 |
| 2019/0065733 | A1* | 2/2019 | Forehand | H04L 9/3247 |
| 2019/0081796 | A1* | 3/2019 | Chow | H04L 9/3247 |
| 2019/0166133 | A1* | 5/2019 | Frederick | H04L 63/061 |
| 2020/0074566 | A1* | 3/2020 | Jain | H04L 63/0876 |

FOREIGN PATENT DOCUMENTS

WO    2017006134 A1    1/2017

OTHER PUBLICATIONS

ISR and Written Opinion that issued in the corresponding International Application No. PCT/EP2018/085456 dated Feb. 14, 2019.

(Continued)

*Primary Examiner* — Shin-Hon (Eric) Chen

(57) ABSTRACT

An example operation may include one or more of identifying one or more attributes of a blockchain, determining the blockchain should be closed based on the one or more attributes, closing the blockchain, creating a new blockchain, identifying one or more assets from the blockchain, and creating a carry-over transaction based on the one or more assets of the blockchain.

17 Claims, 7 Drawing Sheets

(56) References Cited

OTHER PUBLICATIONS

Pineda et al.; "Couldn't the Bitcoin blockchain be restarted someday by crating a new blockchain with starting blocks for the old balance?"; Jul. 27, 2017; pp. 1-2; XP055551872; www.quora.com/couldnt-the-bitcoin-blockchain-be-restarted-someday-by-creating-a-new-blockchain-with-starting-blocks-for-the-old-balance.

Victoria L. Lemieux et al., Preserving the Archival Bond in Distributed Ledgers: A Data Model and Syntax, WWW 17 Companion Proceedings of the 26th International Conference on World Wide Web Companion, ACM, See Abstract, Section 1, 2.1, 3, 4, 4.1 and 5.

James Smith et al., Applying Blockchain Technology in Global Data Infrastructure, Source:http://data.gov.ru/sites/default/files/documents/315354748-applying-blockchain-technology-in-global-data-infrastructure.pdf. Publisher: Open Data Institute, Please refer to p. 15.

\* cited by examiner

BLOCKCHAIN LIFECYCLE MANAGEMENT

TECHNICAL FIELD

This application generally relates to managing a blockchain, and more particularly, to blockchain lifecycle management.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify any information. Because a blockchain is a distributed system, before adding a transaction to the blockchain ledger, all peers need to reach a consensus status.

Scalability is constrained by several factors, such as, but not limited to CPU, network constraints, and storage. Currently, CPU and network are not a large concern as an alternate blockchain implementation can be made that does not verify everything and that may reduce CPU and network load. The storage constraint also has experienced optimal changes from current operating infrastructures, however, there are currently additional challenges, such as pruning of data, which would delete unnecessary data about transactions that are fully spent which unfortunately only results in a relatively small storage optimization. Other approaches, such as using a 'side chain' or alternative-chain that merges back (i.e., simplified/reduced) transactions into another/smaller type of blockchain, where the old transactions can be forgotten by the network has only provided limited results since this implementation is complex to implement. Also, point-to-point transactions that are merged back to the blockchain provide limited results because they are often complex to implement.

SUMMARY

One example embodiment may provide a method that includes one or more of identifying one or more attributes of a blockchain, determining the blockchain should be closed based on the one or more attributes, closing the blockchain, creating a new blockchain, identifying one or more assets from the blockchain, and creating a carry-over transaction based on the one or more assets of the blockchain.

Another example embodiment may include an apparatus that includes a processor configured to perform one or more of identify one or more attributes of a blockchain, determine the blockchain should be closed based on the one or more attributes, close the blockchain, create a new blockchain, identify one or more assets from the blockchain, and create a carry-over transaction for the new blockchain based on the one or more assets of the blockchain.

Yet another example embodiment may provide a non-transitory computer readable storage medium configured to store instructions that when executed causes a processor to perform one or more of identifying one or more attributes of a blockchain, determining the blockchain should be closed based on the one or more attributes, closing the blockchain, creating a new blockchain, identifying one or more assets from the blockchain, and creating a carry-over transaction based on the one or more assets of the blockchain.

DETAILED DESCRIPTION

Figure 1:
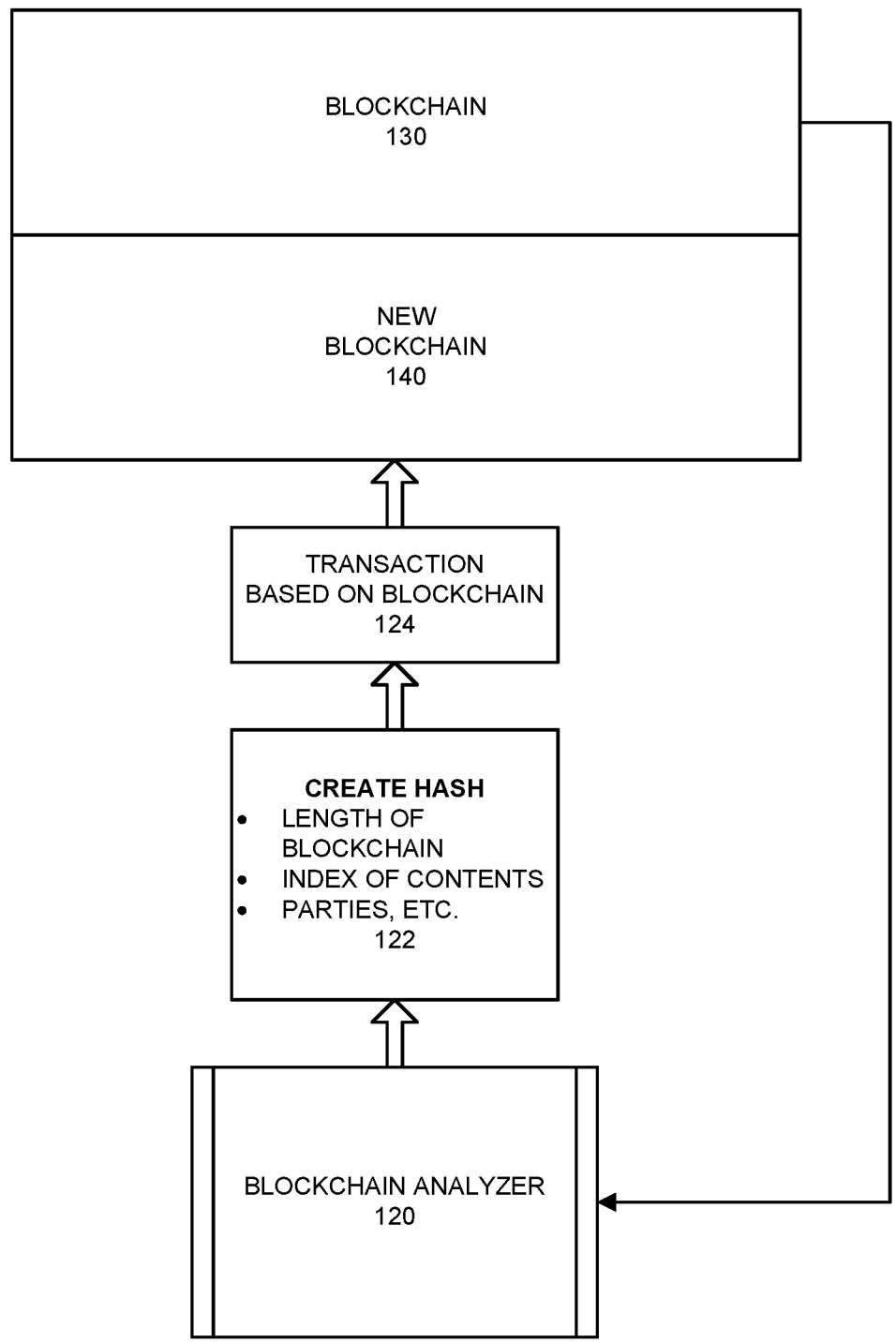
FIG. 1 illustrates a logic diagram of a blockchain closing cycle, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to managing a blockchain lifecycle, and in another embodiment relates to identifying characteristics/attributes of a blockchain over time to determine an optimal time to close the blockchain and create a new blockchain based on ongoing blockchain lifecycle management.

Example embodiments provide a lifecycle management of a blockchain, which includes determining when to close an active blockchain and create a new blockchain. When a blockchain ledger becomes oversized because of excessive data or bandwidth constraints and/or CPU constraints, there may be a reduction of some of the older and/or historical data at some point in time to continue with such a ledger configuration. In one example, the blockchain could undergo a 'self-analysis', and then the application may determine when and where to archive-off (i.e., close) a previous length of the blockchain and then create a new blockchain. The system may create a hash based on the current length/contents of the blockchain and its constituent parties and transactions. That hash is created, in part, by the system back-tracking through the chain to identify, record and process the life-status of the entity, which might be an active resource or a status of a checked-out book in a library among many other possibilities. The blockchain that is closed should have all related transactions included as much as possible. For example, it would be beneficial if the old blockchain had most/all of the transactions that relate to a completed pattern/cycle prior to closing the blockchain.

In one example, a feed of transactions is provided to the blockchain resulting in a traditional blockchain implementation. Monitoring of real-world transactions from the associated block chain may be performed in tandem with a network. Using the above metrics a likelihood of certain links in social graphs to remain in the network is identified, and combined for predicting link decay and relative relatedness. The system configuration may create a hash based on the current length of the blockchain and its constituents, parties and transactions. That hash is created in part by the system back-tracking through the chain to identify, record and process the life-status of the entity. The associated transactions in a blockchain, for example, in the event of a physical activity model for users, those transactions may include gym fees, competition fees, trainer fees, events, etc., which are mapped back to a social network decay model. The defined key performance indicators (KPIs) set for the implementation (e.g. speed, risk, etc.), may be monitored in an ongoing procedure so the lifecycle can be identified as coming to an end and a point in time and/or the cycle can be identified so the blockchain supporting those events can be closed and the data can be archived to support a new lifecycle.

In one example of blockchain lifecycle management, after a period of investigation (e.g., 12 days or 12 months, etc.), from the above, an 'i'-pattern can be identified which describes the optimal chain length. An archive chain might be created with a linkage between the active and inactive chains to preserve continuity when the old blockchain is closed and a new blockchain is created. For example, the new blockchain is created with a linkage to the previous blockchain. Transactions are added to the old chain, for each asset in the ledger to close the balance/state for the asset, while adding a corresponding "carry forward" transaction to the new chain. Once such blockchain transactions have been added for all active assets, the old blockchain can be archived, and the system can continue with the new blockchain.

During blockchain self-analysis, the blockchain may be identified as needing to end based on an identified lifecycle end, such as a lifecycle trigger, a blockchain threshold size, a passing of time, or other factors described in the example embodiments. In this example, when the blockchain length is long enough and a new blockchain should be created, that reason may be identified and a modification may be made accordingly. In one example, the relatedness of the entities/assets of the blockchain may cause a change or trigger to end the blockchain, when the bulk of the related transactions have mostly completed then it may be an appropriate time to close-off the current blockchain and create a new blockchain. A relative decay rate (i.e., longevity) may be derived from a social network. For example, if the topic, thread or discussion is related to a "cat", and the average length of the discussion is four hours and the average discussion length for a "movie discussion" is five days. Also, topics are tracked for relatedness, so the "cat" topic may not usually associate with a "movie discussion" thread, and thus even though the discussions happened nearly at the same time it would be acceptable to put those topics in separate blockchains as being disassociated. If a blockchain administrator identified an instance with too much CPU, storage, memory and/or bandwidth being used, then that might be used as an additional weight factor or lifecycle trigger on when to create a new blockchain. For instance, if there are more than 2300 MB being used for a current blockchain then an analysis may be used to determine if it is logical to create a new blockchain. Based on the analysis, the current blockchain may still keep expanding to 8900 MB because it is not logical yet to close the blockchain depending on a current status of the social lifecycle triggers. When the blockchain is closed and a new blockchain is created the old blockchain may be used to create a carry-over transaction that is stored in the new blockchain and which essentially functions as a "pointer" to the older and valid/related chains. The blockchain management application and/or system may ascertain objects of interest or entities from the current blockchain, and using relevant and existing statistical techniques, those objects may be modeled with a social network for relatedness, decay-rate and clustering. Those objects, changes and other considerations may be used to make a decision on how to create a new blockchain.

FIG. 1 illustrates a logic diagram of a blockchain closing cycle, according to example embodiments. Referring to FIG. 1, in this configuration 100, when a blockchain 130 is active and is currently storing, committing new transactions and being referenced via audit procedures for reference to previous transactions, then the blockchain may be persisted and new transactions may be added for an indefinite period of time. During monitoring, one or more lifecycle trigger conditions may be identified and a need for a new blockchain 140 may be triggered. A blockchain analyzer 120 may be an ongoing software process/module stored in memory and configured to identify blockchain transactions, size of the blockchain, dates and transaction interactions, which are interrelationships between transactions which provide a relative degree of certainty regarding the lifecycle of those transaction relationships. Example criteria for blockchain transactions is identified and a final hash is created 122 to close the blockchain at the appropriate time. The information regarding the previous blockchain is written to a new transaction 124, which is added to the new blockchain 140 as the new blockchain is created and the old blockchain 130 is closed and shut-off from any new transactions being added.

Figure 2A:
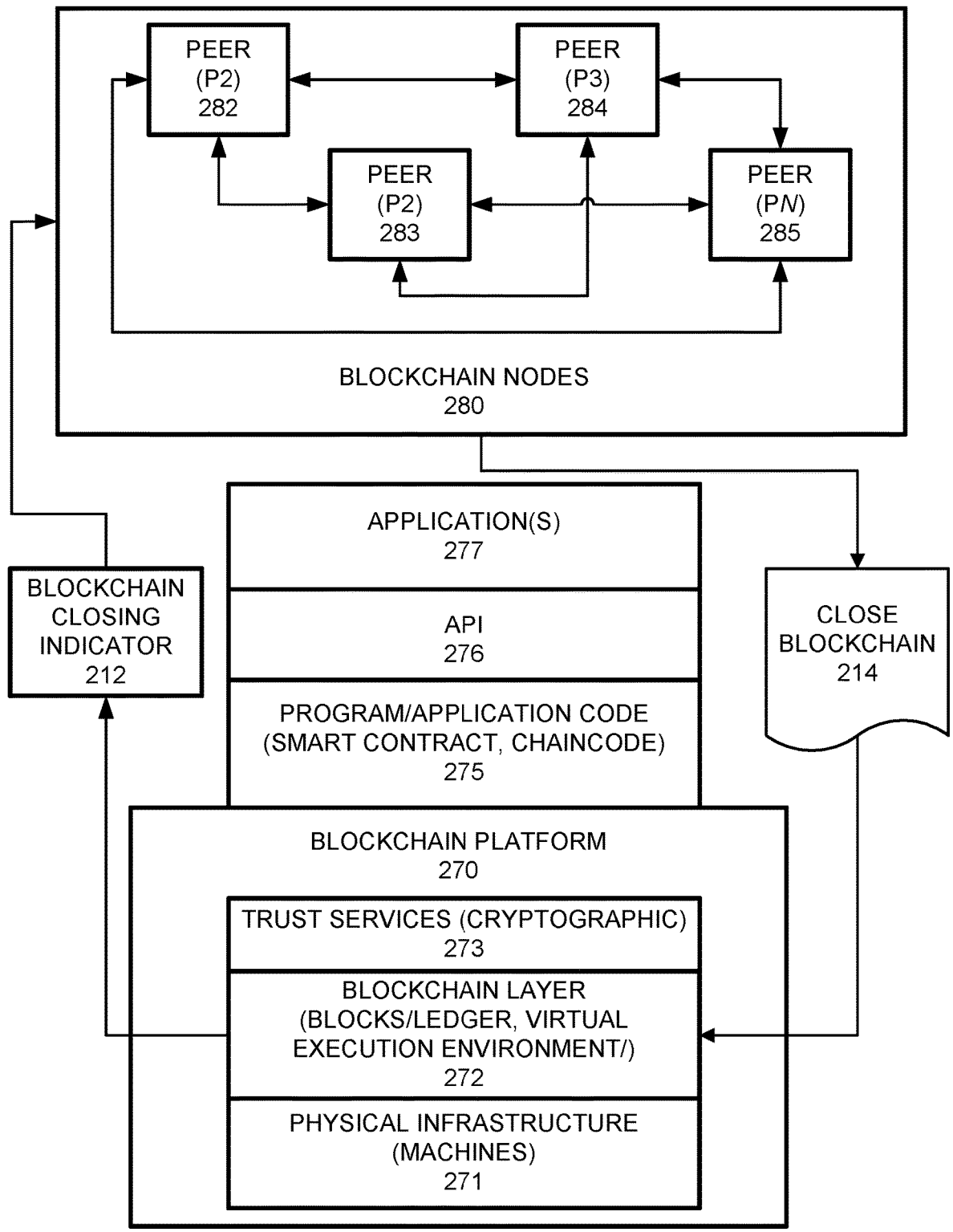
FIG. 2A illustrates an example blockchain configuration for performing a blockchain closing cycle, according to example embodiments.

FIG. 2A illustrates an example blockchain configuration for performing blockchain closing and new blockchain creation, according to example embodiments. Referring to FIG. 2A, the blockchain system 200A may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2A may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a blockchain closing indicator or trigger 212 may be identified by the peer nodes 280. The nodes may identify a need to close the blockchain and then at some point reach consensus and permit the new blockchain to be created. Also, a blockchain closing operation 214 may be performed to enact the closure and a new blockchain creation cycle.

Figure 2B:
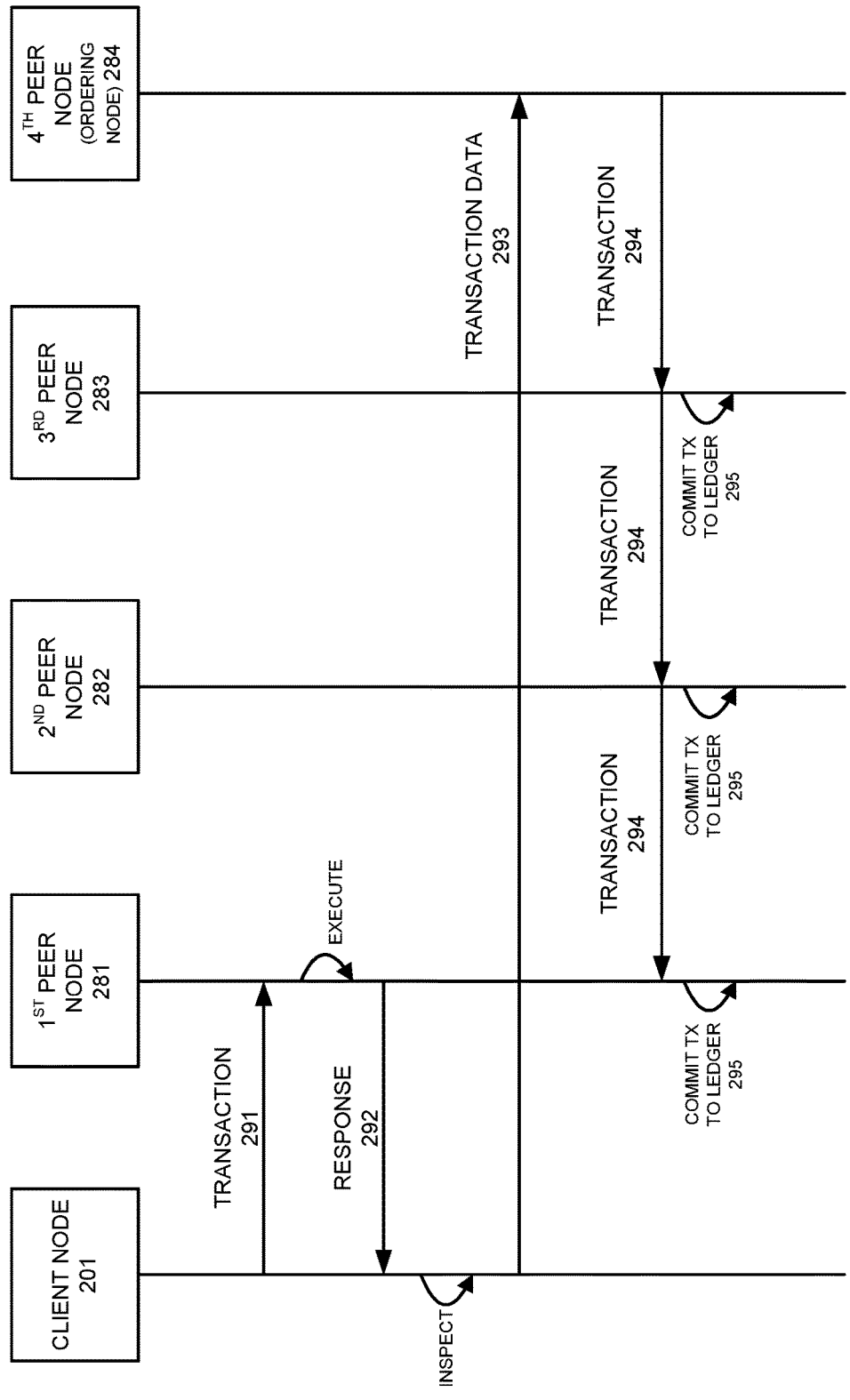
FIG. 2B illustrates an example peer node blockchain configuration, according to example embodiments.

FIG. 2B illustrates an example of a transactional flow 200B between nodes of the blockchain in accordance with an example embodiment. Referring to FIG. 2B, the transaction flow may include a transaction proposal sent by an application client node 201 to an endorsing peer node 281. The endorsing peer 281 may verify the client signature, and execute a chaincode function to simulate the transaction. The output is the chaincode results, a set of key/value versions that were read in the chaincode (read set), and the set of keys/values that were written in chaincode (write set). The proposal response gets sent back to the client 201 along with an endorsement signature. The client assembles the endorsements into a transaction payload and broadcasts it to an ordering service node 284. The ordering service node 284 then delivers ordered transactions as blocks to all peers 281-283 on a channel. Before committal, each peer 281-283 may validate the transactions. For example, they may check the endorsement policy to ensure that the correct allotment of the specified peers have signed the results, and authenticate the signatures against the transaction payload.

Referring to FIG. 2B, in step 291 the client node 201 initiates the transaction by constructing and sending a request to the peer node 281 which is an endorser. The client 201 may include an application leveraging a supported software development kit (SDK) such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (gRPC)) and take the client's cryptographic credentials to produce a unique signature for this transaction proposal.

In response, the endorsing peer node 281 may verify (a) that the transaction proposal is well formed, (b) the transaction has not been submitted already in the past (replay-attack protection), (c) the signature is valid, and (d) that the submitter (client 201, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In step 292, the set of these values, along with the endorsing peer node's 281 signature is passed back as a proposal response to the SDK of the client 201 which parses the payload for the application to consume.

In response, the application of the client 201 inspects/verifies the endorsing peer signatures and compares the proposal responses to determine if the proposal response is the same. If the chaincode only queried the ledger, the application would inspect the query response and would typically not submit the transaction to the ordering service 284. If the client application intends to submit the transaction to ordering service 284 to update the ledger, the application determines if the specified endorsement policy has been fulfilled before submitting (i.e., did peer nodes necessary for the transaction both endorse). Here, the client may include only one of multiple parties to the transaction. In this case, each client may have their own endorsing node, and each endorsing node will need to endorse the transaction. The architecture is such that even if an application chooses not to inspect responses or otherwise forwards an unendorsed transaction, the endorsement policy will still be enforced by peers and upheld at the commit validation phase.

After successful inspection, in step 293 the client 201 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation; it may simply receive transactions from all channels in the network, order them chronologically by channel, and create blocks of transactions per channel.

In step 294, the blocks of the transaction are delivered from the ordering node 284 to all peer nodes 281-283 on the channel. The transactions within the block are validated to ensure endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as notification of whether the transaction was validated or invalidated.

Figure 3:
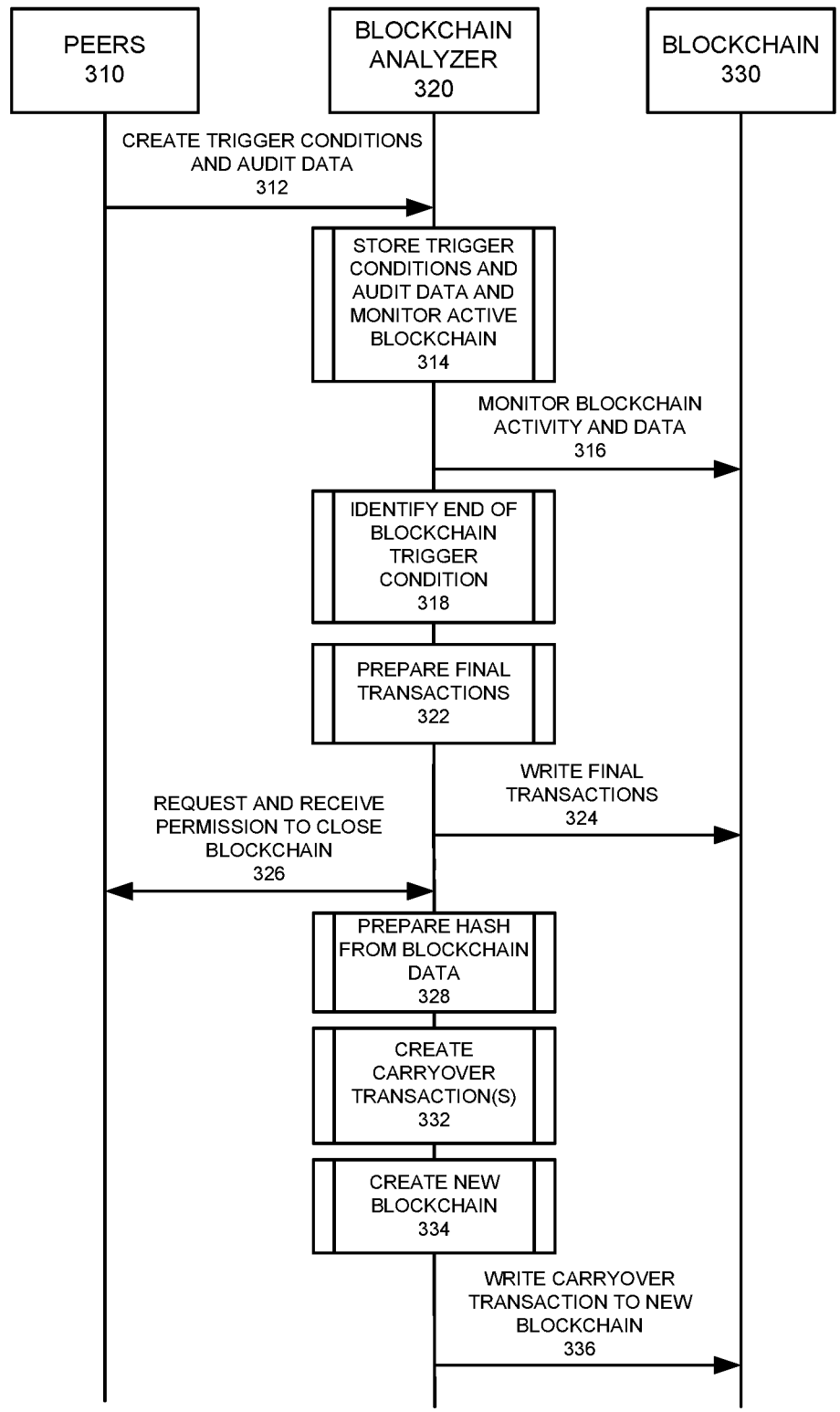
FIG. 3 illustrates a system messaging diagram for processing a blockchain closing cycle and a new blockchain creation cycle, according to example embodiments.

FIG. 3 illustrates a system messaging diagram 300 for processing a blockchain closing cycle and a new blockchain creation cycle, according to example embodiments. Referring to FIG. 3, the entities managing the blockchain lifecycle may include blockchain peers 310, a blockchain analyzer module 320 and the blockchain 330. In operation, the reasons and actions, including triggers and other conditions 312 used to close the blockchain may be identified and stored as a set of rules in a smart contract or other processing engine managed by the analyzer 320. The conditions are stored 314 and used to audit and monitor 316 the blockchain 330. An end of blockchain trigger condition 318 may eventually be identified and used to prepare final transactions 322 of the current blockchain as a winding-up procedure to write the final and last transactions to the blockchain. The transactions are written to the blockchain 324 and the condition may require a request and permission (i.e., consensus) 326 prior to finalizing and closing the blockchain. A hash 328 can be calculated to represent the blockchain along with a carryover transaction 332 used to point to certain transactions and related information which may likely be needed for reference purposes in the new blockchain. The new blockchain is then crated 334 and is populated with the carryover transaction 336.

Figure 4A:
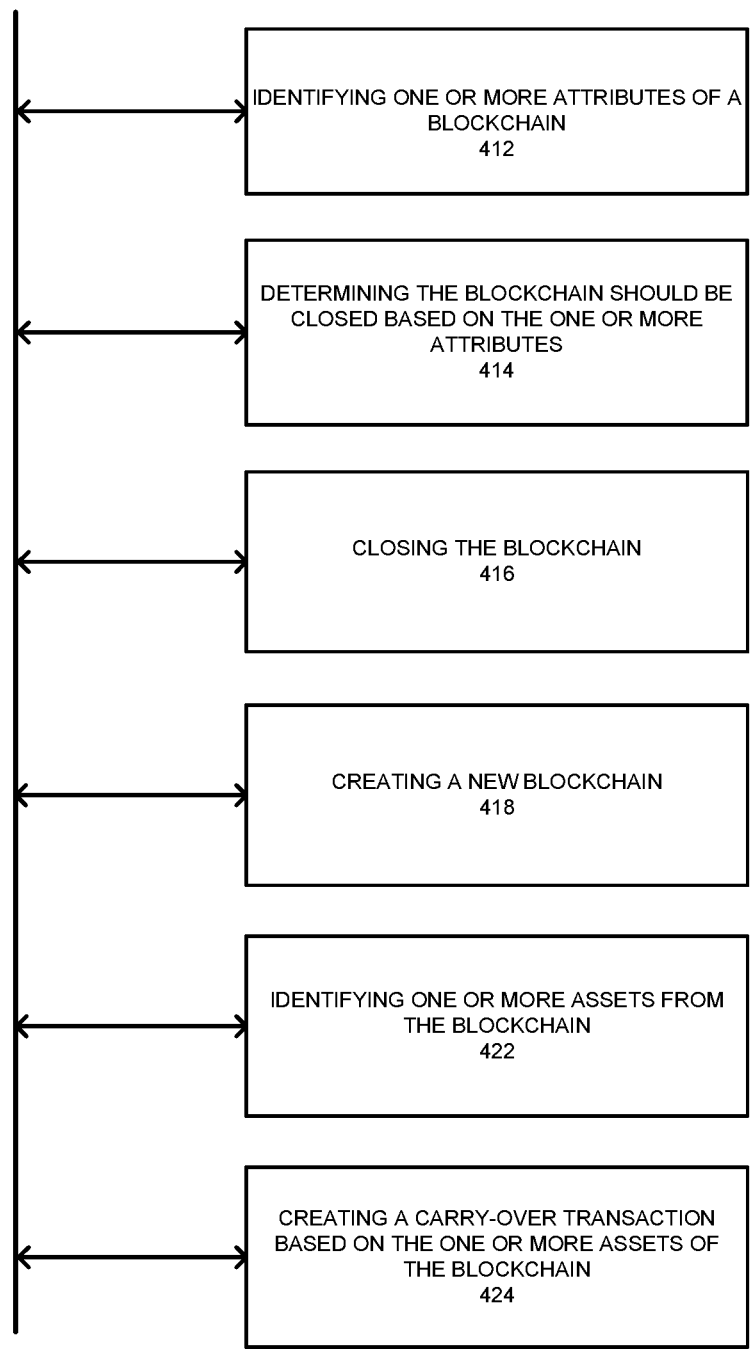
FIG. 4A illustrates a flow diagram of an example method of managing a blockchain lifecycle, according to example embodiments.

FIG. 4A illustrates a flow diagram of an example method of managing a blockchain lifecycle, according to example embodiments. Referring to FIG. 4A, the method 400 may provide identifying one or more attributes of a blockchain 412, determining the blockchain should be closed based on the one or more attributes 414, closing the blockchain 416, creating a new blockchain 418, identifying one or more assets from the blockchain 422, and creating a carry-over transaction based on the one or more assets of the blockchain 424. The one or more attributes comprise lifecycle triggers that when identified cause the blockchain to close, and the lifecycle triggers can include a number of blockchain transactions, a time lapse since one or more of the blockchain transactions were audited, an expiration date, and a threshold size of the blockchain. The one or more assets may provide active assets with active lifecycles and inactive assets. The method may also include storing the carry-over transaction in the new blockchain, creating one or more blockchain transactions based on the one or more assets, wherein the one or more blockchain transactions are created to represent a closeout state of the one or more assets, and the carry-over transaction includes active asset information of the one or more assets that have not received a closeout status.

Figure 4B:
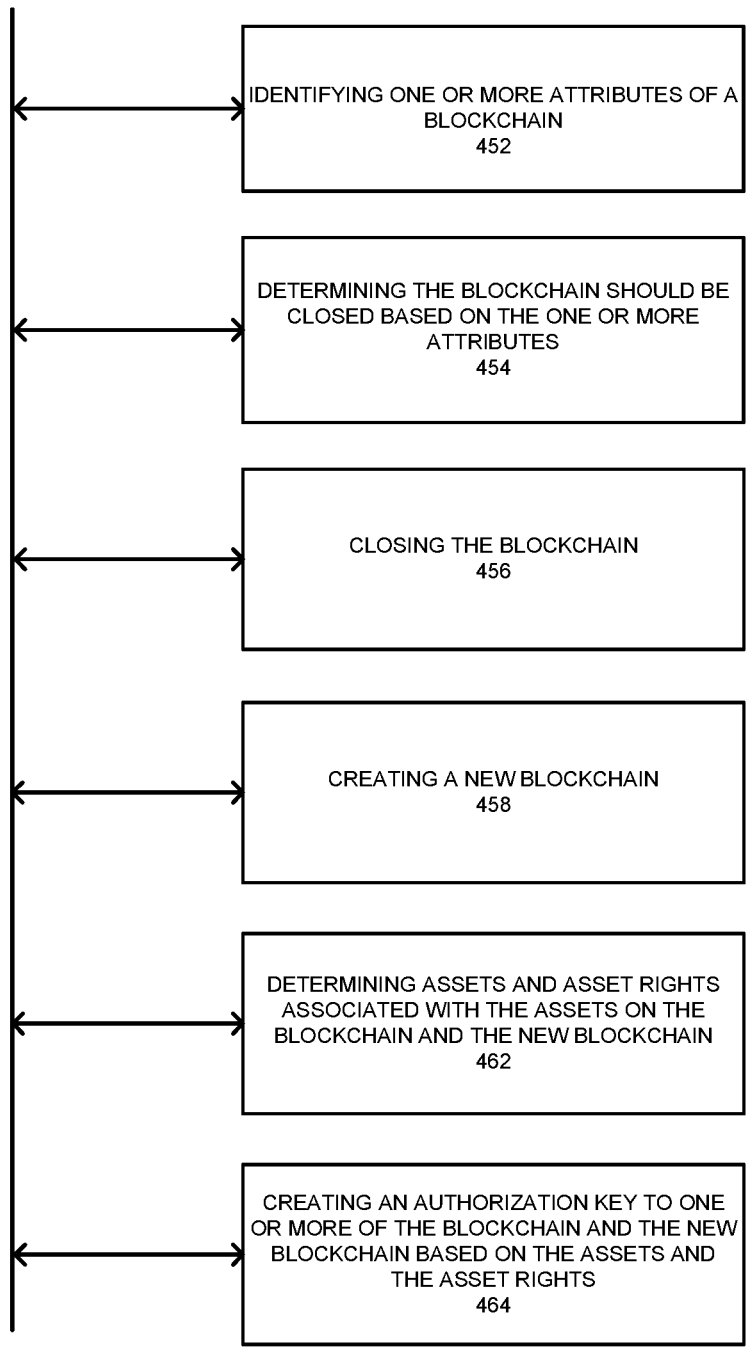
FIG. 4B illustrates another flow diagram of an example method of managing a blockchain lifecycle, according to example embodiments.

FIG. 4B illustrates another flow diagram of an example method of managing a blockchain lifecycle, according to example embodiments. Referring to FIG. 4B, the method 450 may include identifying one or more attributes of a blockchain 452, determining the blockchain should be closed based on the one or more attributes 454, closing the blockchain 456, creating a new blockchain 458, determining assets and asset rights associated with the assets on the blockchain and the new blockchain 462, and creating an authorization key to one or more of the blockchain and the new blockchain based on the assets and the asset rights 464.

In this embodiment, the closing of a blockchain represents an opportunity to establish whether rights to the various information/assets of the blockchain should be forwarded to one or more members of the new blockchain. Part of the reason for closing the blockchain may be to secure rights to the blockchain and not permit additional parties to access the blockchain especially due to the asset information on the blockchain or the rights and known parties. Access may be granted to certain parties for both the new and the old blockchain, one, or none of the blockchains. The asset information in the blockchains may be paired to the members that deserve access and those that do not deserve access. The authorization key may permit certain members to have access while others do not receive such access to the information archived in the old blockchain. Also, all members may have access to a new blockchain pending more information regarding the assets which are written to the new blockchain and until that new blockchain is closed and another new blockchain is initiated.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
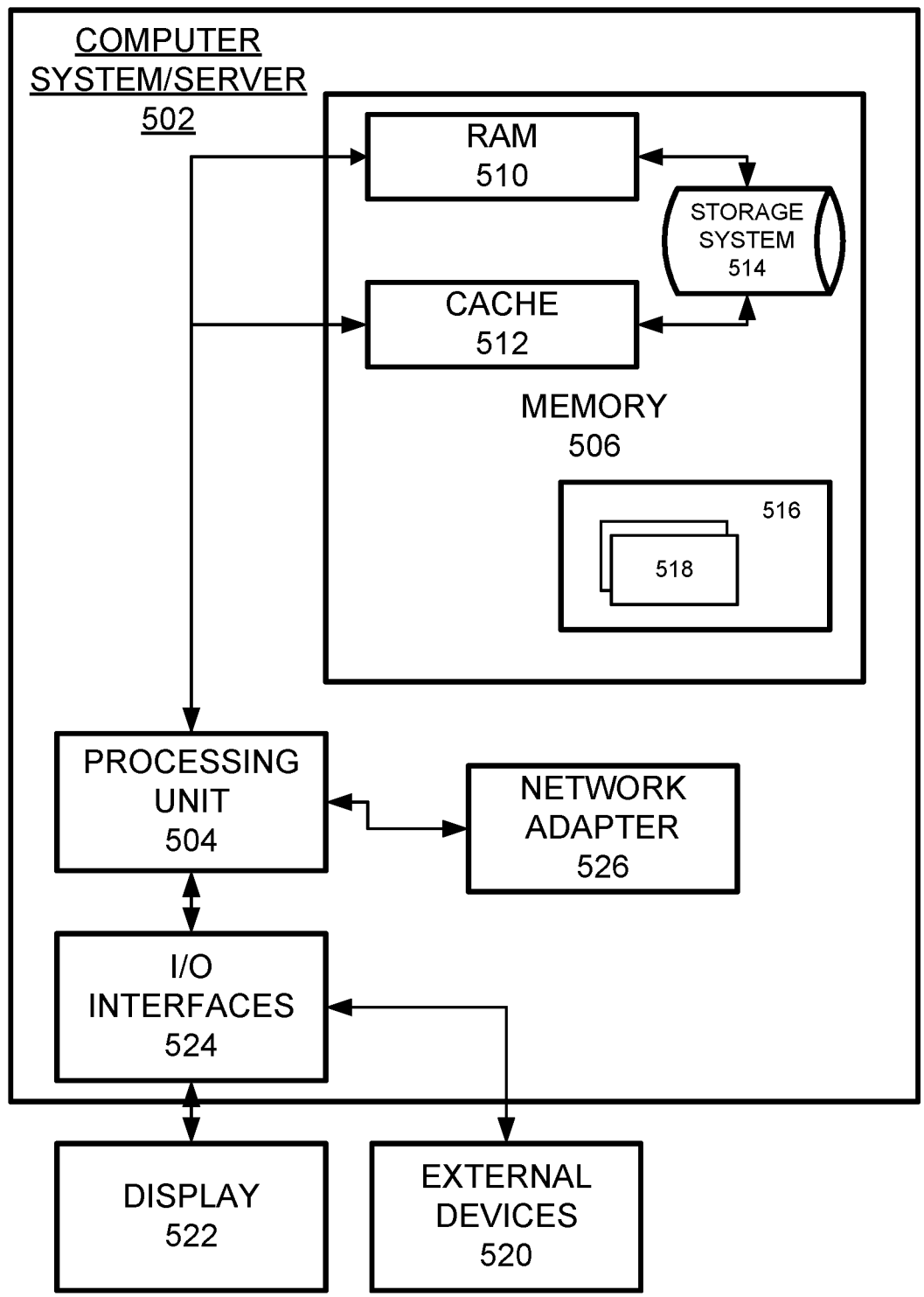
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   storing information indicating at least one lifecycle trigger for a blockchain;
   repeatedly controlling performance of an auditing operation of one or more attributes of the blockchain over time;
   mapping the one or more attributes of the blockchain to a decay model corresponding to the at least one lifestyle trigger after performance of each auditing operation, the decay model generates an indication of an expected change in relatedness of subject matter of transactions recorded in the blockchain, the expected change in relatedness based on statistical information corresponding to subject matter discussions occurring on a social network;
   determining the blockchain is to be closed based on a result of the mapping;
   closing the blockchain;
   creating a new blockchain;
   identifying one or more assets from the blockchain; and
   creating a carry-over transaction be recorded in the new blockchain based on the one or more assets of the blockchain.

2. The method of claim 1, wherein the at least one lifecycle trigger comprises at least one of a number of blockchain transactions, a time lapse since one or more of the blockchain transactions were audited, an expiration date, and a threshold size of the blockchain.

3. The method of claim 1, wherein the one or more assets comprise active assets, with active lifecycles, and inactive assets.

4. The method of claim 1, further comprising:
   storing the carry-over transaction in the new blockchain.

5. The method of claim 1, further comprising:
   creating one or more blockchain transactions based on the one or more assets,
   wherein the one or more blockchain transactions are created to represent a closeout state of the one or more assets.

6. The method of claim 1, wherein the carry-over transaction comprises active asset information of the one or more assets that have not received a closeout status.

7. An apparatus, comprising:
   a non-transitory computer-readable medium storing instructions; and
   a processor configured to execute the instructions to:
      store information indicating at least one lifecycle trigger for a blockchain;
      repeatedly control performance of an auditing operation of one or more attributes of the blockchain over time;
      map the one or more attributes of the blockchain to a decay model corresponding to the at least one lifestyle trigger after performance of each auditing operation, the decay model generates an indication of an expected change in relatedness of subject matter of transactions recorded in the blockchain, the expected change in relatedness based on statistical information corresponding to subject matter discussions occurring on a social network;
      determine the blockchain is to be closed based on a result of the map;
      close the blockchain;
      create a new blockchain;
      identify one or more assets from the blockchain; and
      create a carry-over transaction to be recorded in the new blockchain based on the one or more assets of the blockchain.

8. The apparatus of claim 7, wherein the at least one lifecycle trigger comprises at least one of a number of blockchain transactions, a time lapse since one or more of the blockchain transactions were audited, an expiration date, and a threshold size of the blockchain.

9. The apparatus of claim 7, wherein the one or more assets comprise active assets, with active lifecycles, and inactive assets.

10. The apparatus of claim 7, wherein the processor is further configured to:

store the carry-over transaction in the new blockchain.

11. The apparatus of claim 7, wherein the processor is further configured to:
   create one or more blockchain transactions based on the one or more assets,
   wherein the one or more blockchain transactions are created to represent a closeout state of the one or more assets.

12. The apparatus of claim 7, wherein the carry-over transaction comprises active asset information of the one or more assets that have not received a closeout status.

13. A non-transitory computer readable storage medium configured to store instructions that when executed causes a processor to processor to perform:
   storing information indicating at least one lifecycle trigger for a blockchain;
   repeatedly controlling performance of an auditing operation of one or more attributes of the blockchain over time;
   mapping the one or more attributes of the blockchain to a decay model corresponding to the at least one lifestyle trigger after performance of each auditing operation, the decay model generates an indication of an expected change in relatedness of subject matter of transactions recorded in the blockchain, the expected change in relatedness based on statistical information corresponding to subject matter discussions occurring on a social network;
   determining the blockchain is to be closed based on a result of the mapping;
   closing the blockchain;
   creating a new blockchain;
   identifying one or more assets from the blockchain; and
   creating a carry-over transaction to be recorded in the new blockchain based on the one or more assets of the blockchain.

14. The non-transitory computer readable storage medium of claim 13, wherein the at least one lifecycle trigger comprises at least one of a number of blockchain transactions, a time lapse since one or more of the blockchain transactions were audited, an expiration date, and a threshold size of the blockchain.

15. The non-transitory computer readable storage medium of claim 13, wherein the one or more assets comprise active assets, with active lifecycles, and inactive assets.

16. The non-transitory computer readable storage medium of claim 13, wherein the processor is further configured to perform: storing the carry-over transaction in the new blockchain.

17. The non-transitory computer readable storage medium of claim 13, wherein the processor is further configured to perform:
   creating one or more blockchain transactions based on the one or more assets,
   wherein the one or more blockchain transactions are created to represent a closeout state of the one or more assets, and
   wherein the carry-over transaction comprises active asset information of the one or more assets that have not received a closeout status.

* * * * *